US008173058B2

(12) United States Patent
Henning

(10) Patent No.: US 8,173,058 B2
(45) Date of Patent: May 8, 2012

(54) SOLVENT-FREE RELEASE AGENT AND ITS USE IN THE PRODUCTION OF POLYURETHANE MOLDINGS

(75) Inventor: Torsten Henning, Hanau (DE)

(73) Assignee: Evonik Goldschmidt GmbH, Essen (DE)

( * ) Notice: Subject to any disclaimer, the term of this patent is extended or adjusted under 35 U.S.C. 154(b) by 637 days.

(21) Appl. No.: 12/124,249

(22) Filed: May 21, 2008

(65) Prior Publication Data
US 2009/0020917 A1  Jan. 22, 2009

(30) Foreign Application Priority Data
Jul. 19, 2007 (EP) .................................. 07112750

(51) Int. Cl.
B28B 7/36 (2006.01)
B29D 7/00 (2006.01)
C04B 41/50 (2006.01)

(52) U.S. Cl. ..................... 264/338; 264/213; 106/38.22; 106/287.1

(58) Field of Classification Search ................. 106/38.2, 106/38.22, 38.35, 287.1, 287.34; 264/213, 264/338
See application file for complete search history.

(56) References Cited

U.S. PATENT DOCUMENTS

| 3,963,656 A | * | 6/1976 | Meisert et al. ................. 524/230 |
| 4,198,362 A | * | 4/1980 | Ticker et al. ................. 264/40.1 |
| 4,399,088 A | | 8/1983 | Greene |
| 4,925,882 A | | 5/1990 | Makus |
| 5,177,136 A | | 1/1993 | Herres et al. |
| 5,218,024 A | | 6/1993 | Krug et al. |
| 6,040,278 A | * | 3/2000 | Kok et al. ...................... 508/208 |
| 2005/0167071 A1 | * | 8/2005 | Kendall et al. .................. 164/72 |
| 2007/0108659 A1 | | 5/2007 | Althoff et al. |
| 2007/0110840 A1 | | 5/2007 | Althoff et al. |
| 2007/0112083 A1 | | 5/2007 | Althoff et al. |
| 2007/0132151 A1 | | 6/2007 | Althoff et al. |
| 2007/0283844 A1 | | 12/2007 | Henning |
| 2008/0047464 A1 | | 2/2008 | Henning |

FOREIGN PATENT DOCUMENTS

| DE | 3742370 C2 | 6/1989 |
| DE | 3821908 | 1/1990 |
| DE | 3821908 A1 | 1/1990 |
| DE | 4020036 C2 | 1/1992 |

OTHER PUBLICATIONS

Sigma-Aldrich. Physical properties of undecane.*
Pt Kawiputra Jaya Perkasa. Physical Properties of Pionier Oil.*
"Formtrenmittel mit Vestowax®", "Coatings and Colorings," Degussa, Feb. 2001.
Malitschek, O., "Waxes by Clariant, production, characteristics and applications", Clariant, May 2003 pp. 1-104.

* cited by examiner

Primary Examiner — Jerry Lorengo
Assistant Examiner — Carlos Barcena
(74) Attorney, Agent, or Firm — Scully, Scott, Murphy & Presser, P.C.

(57) ABSTRACT

The invention provides solvent-free release agents for producing polyurethane moldings, substantially including:
  A) at least one wax having release activity;
  B) at least one oil having release activity; and
  C) if desired, further auxiliaries and adjuvants,
with the proviso that the release agent contains no water and no volatile organic solvent, and the oil with release activity is substantially free from unsaturated hydrocarbons.

15 Claims, No Drawings

SOLVENT-FREE RELEASE AGENT AND ITS USE IN THE PRODUCTION OF POLYURETHANE MOLDINGS

FIELD OF THE INVENTION

The invention relates to release agents and to their use in the production of polyurethane moldings.

BACKGROUND OF THE INVENTION

It is known that polyurethane systems employed for producing moldings exhibit strong adhesion to the mold materials that are used, preferably highly thermally conductive materials such as metals. For the production of polyurethane moldings in molds made from the stated materials, there is a need for release agents, which are applied to the mold walls that come into contact with polyurethanes and/or with the polyurethane reaction mixture, Release agents of this kind are typically composed of dispersions or emulsions of waxes, soaps, oils and/or silicones in solvents such as hydrocarbons. Following application of the release agent to the mold, the solvent evaporates and the nonvolatile substances with release activity form a thin release film which allows the polyurethane molding to be removed easily from the mold following production.

In addition to the release effect that is actually needed, the release agent also takes on further functions. For instance, the release agent also greatly influences the surface of the polyurethane molding, which is to be fine-pored or smooth and uniform, for the purpose, among others, of ensuring that the completed shaped parts can easily be covered with fabrics or leather.

In order to reduce the environmental burden of volatile organic material there is a great interest in release agents which are free from volatile organic material.

One option that is available is to switch to water as the solvent or vehicle for the substances with release activity. However, as compared with conventional release agents containing organic solvents, aqueous release agents that are presently on the market exhibit the disadvantage that, after a major portion of the water has evaporated, there remains a thin film of water left in the mold, which is not volatilized at the typical molding temperatures of 45 to 80° C., preferably 50 to 75° C., and which enters into reactions with the isocyanate compounds of the polyurethane system that lead to very hard polyurea compounds. These compounds form a so-called buildup on the mold surface, which is detrimental to the release effect and must be removed, in a costly and inconvenient operation.

Typical examples of aqueous release agents having a relatively good demolding effect are described, for example, in DE-A-37 42 370 or DE-C-40 20 036. The substance with release activity that these agents contain comprises unsaturated oligomeric or polymeric hydrocarbons having molecular weights of at least 500 g/mol and iodine numbers of at least 60, more preferably the unsaturated oligomeric or polymeric hydrocarbon is liquid polybutadiene having molecular weights of approximately 3000 g/mol and iodine numbers of approximately 450.

A particularly disadvantageous phenomena associated with these release agents are the severe discolorations which occur, and which are caused by oxidation of the double bonds within the unsaturated oligomeric or polymeric hydrocarbons.

A further problem of the above-mentioned release agents is the frequent incidence of allergies among employees who work with these release agents or with the shaped parts produced with their assistance.

In addition to the above-described problem of polyurea buildup on the mold surfaces, these release agents exhibit a further disadvantage that the substance with release activity, which takes the form of a viscous oil, greatly soils the working environment. On machines and equipment, a sticky, greasy film is formed which is difficult to remove; even when great care is taken, the soiling of the surrounding area cannot be avoided with certainty, with the consequence that a slippery, greasy film that is hard to remove is formed, for example, on the floors, and represents an unacceptable hazard potential for the employees.

Owing to the double bonds present in the unsaturated oligomeric or polymeric hydrocarbons, this greasy film can also react further, to form resinous, sticky coats, for example, which are almost impossible to remove with conventional cleaning products.

U.S. Pat. No. 5,218,024, which takes another path, solventlessly uses liquid polymeric polyenes such as polybutadienes having viscosities of approximately 3000 mPa s at 20° C. In some cases, the liquid polymeric polyenes are admixed with additives such as greases, waxes or oils for the purpose of modifying the viscosity and/or enhancing the release effect, and also with further additives such as antioxidants, for instance. Where appropriate, these release agents are sprayed hot.

These release agents, however, are based on the same substances as in D)E-A-37 42 370 or DE-C-40 20 036, which were discussed above, and hence give rise to the same disadvantages, such as strong discolorations and severe soiling of the working environment, through to the buildup of resinous, sticky coats.

In the view of the above, there is a need for mold release agents which are free from volatile organic solvents or water Such mold release agents should not have the abovementioned disadvantages, and more particularly should exhibit a good release effect, or preferably have a beneficial effect on the surfaces of the polyurethane moldings, thus leaving them fine-pored, uniform, and smooth. Additionally, such mold release agents should not leave any buildup of polyurea on the mold surfaces, or contaminate the working environment with a greasy film, yet they should have a low allergy potential.

SUMMARY OF THE INVENTION

Surprisingly it has now been found that mold release agents which are free from volatile organic solvents or water and having the properties mentioned in the preceding paragraph are achieved by a mix of conventional waxes with release activity together with oils with release activity, without volatile solvents, i.e., without solvents which have a boiling temperature of <250° C. or a vapor pressure at 293.15 kelvins of >0.01 kilopascal.

The invention accordingly provides release agents for producing polyurethane moldings, preferably comprising, and with particular preference consisting of:
  A) at least one wax having release activity;
  B) at least one oil having release activity; and
  C) if desired (i.e., optionally), further auxiliaries and adjuvants,
with the proviso that the release agent contains no water and no volatile organic solvent, and the oil with release activity is substantially free, preferably completely free, from unsaturated hydrocarbons.

The invention further provides for the use of these release agents in the production of polyurethane moldings.

DETAILED DESCRIPTION OF THE INVENTION

The present invention, which provides mold release agents which are free from volatile organic solvents or water, and the use of such mold release agents in the production of polyurethane moldings, will now be described in greater detail.

As stated above, the present invention provides release agents that comprise, consist essentially of, or consist of A) at least one wax having release activity; and B) at least one oil having release activity, with the proviso that the release agent contains no water and no volatile organic solvent, and the oil with release activity is substantially free, preferably completely free, from unsaturated hydrocarbons. The inventive release agents may also include further auxiliaries and adjuvants.

The release agents of the invention have the advantage that the burdening of the environment with solvent vapors is avoided. The release agents of the invention additionally have the advantage that the buildup of polyurea on the mold is avoided. A further advantage of the invention is that severe discolorations and severe soiling, and the buildup of resinous, sticky coats, are prevented.

The release agents of the invention and their use are described exemplarily below, without any intention that the invention should be confined to these exemplary embodiments. Where ranges, general formulae or classes of compound are specified below, they are intended to comprise not only the corresponding ranges or groups of compounds which are explicitly mentioned but also all subranges and subgroups of compounds which can be obtained by extracting individual values (ranges) or compounds. Where the present description cites documents, their content is intended to belong in its entirety to the disclosure content of the present invention.

The release agents of the invention for producing polyurethane moldings are distinguished by the fact that they have:
  A) at least one wax having release activity,
  B) at least one oil having release activity; and
  C) if desired, further auxiliaries and adjuvants,
preferably essentially having these constituents, and more preferably consisting of these constituents, with the proviso that the release agent contains no water and no volatile organic solvent (volatile organic compound, VOC), and the oil with release activity is substantially free (fraction of unsaturated hydrocarbons in the oil with release activity of <1% by mass, preferably <0.1% by mass, and more preferably less than <0.01% by mass), preferably completely free (fraction of unsaturated hydrocarbons in the oil with release activity below the detection limit), from unsaturated hydrocarbons.

Volatile organic solvents for the purposes of the present invention are those volatile organic compounds (VOC) which have a boiling temperature of <250° C. or, preferably, a vapor pressure at 293.15 kelvins of >0.01 kilopascal.

The release agents preferably comprise or with preference consist of:
  A) 50% to 99.5% by weight of wax having release activity;
  B) 0.5% to 50% by weight of oil having release activity; and
  C) if desired, faither auxiliaries and adjuvants.
With particular preference the release agents consist of:
  A) 80% to 99% by weight of wax having release activity;
  B) 1% to 20% by weight of oil having release activity; and
  C) if desired, further auxiliaries and adjuvants.

As conventional waxes with release activity the release agents of the invention may have, for example, liquid, solid, natural or synthetic waxes, including those which have been oxidized and/or partly hydrolyzed, esters of carboxylic acids with alcohols or fatty alcohols, or metal soaps, such as alkali metal salts or alkaline earth metal salts of fatty acids. Particular preference is given to synthetic paraffin waxes. Typical waxes with release activity are listed, for example, in the company brochures "Waxes by Clariant, production, characteristics and applications", Clariant May 2003, and "Formtrenmittel mit Vestowax®", Degussa, February 2001.

As oils with release activity, it is possible to use saturated hydrocarbons which are viscous or liquid at room temperature, saturated oligomeric and/or polymeric hydrocarbons, and/or silicone oils, such as polydimethylsiloxanes, substituted, if desired, by aliphatic or aromatic hydrocarbon radicals. As oils with release activity, it is preferred to use polydimethylsiloxanes and/or saturated hydrocarbons which are viscous or liquid at room temperature.

As oils with release activity, it is possible more particularly to use hydrocarbons which have a boiling temperature of $\geq 250°$ C. or (preferably and) a vapor pressure at 293.15 kelvins of $\leq 0.01$ kilopascal. According to German or European definition in the 31st BImSchV [German Federal Airborne Pollution Control Ordinance], these oils are then no longer volatile organic compounds. Preferably the release agents of the invention have, as an oil, highly refined mineral oil, composed of naphthenic, aromatic and/or paraffinic hydrocarbons. The oil employed preferably exhibits a kinematic viscosity at 40° C. in accordance with DIN 51 562 part 1 of between 10 and 150 $mm^2/s$, preferably from 20 to 100 $mm^2/s$. These oils are available on the market under the brand names Gravex®, Deutsche Shell AG, or Pionier®, Hansen & Rosenthal KG.

As typical auxiliaries and adjuvants it is possible, for example, for one or more compounds to be present or to be used that are selected from the groups listed below.
  I) Catalysts, more particularly those typically used for the polyurethane reaction, examples including Lewis acids such as tin compounds, alkali metal salts or organic bismuth salts, or Lewis bases such as tertiary amines;
  II) Foam stabilizers, such as polysiloxane-polyether copolymers, for example. These foam stabilizers are described, for example, in Ed. R. Herrington et al., Appendix E Surfactants, Flexible Polyurethane Foams, The Dow Chemical Company, 2nd edition, 1997.
  III) Inorganic materials, more particularly minerals, such as talc or minerals from the family of the layered silicates, also called phyllosilicates, which consist primarily of magnesium silicate and may contain various admixtures such as chlorite or other accompanying minerals. Micas as well, in other words layered silicates into which large cations such as $K^+$, $Na^+$ or $Ca^{2+}$ have been incorporated, are suitable. The use of such inorganic materials as auxiliaries in release agents of the invention has the advantage that they can be used to achieve an improvement in the release action and surface properties of the shaped parts produced.

The release agents of the invention can be prepared in accordance with the methods known in the art. A preferred procedure is to start with the waxes with release activity in a melted form and then to introduce the oil, where appropriate together with auxiliaries and adjuvants.

After that the release agent, if it is solid at room temperature, can be pelletized or flaked, The inventive release agents can be employed in the production of polyurethane moldings: for example, in the production of auto seats, mattresses, etc.

In the production of polyurethane moldings, the mold can first be brought, for example, to the desired molding temperature of preferably 45 to 80° C., more preferably 50 to 75° C. Subsequently the mold is provided with the release agent. This can be done, for example, by spraying the mold finely and uniformly with the release agent, and then waiting for some time until a uniform release film has formed. The mold furnished with the release agent can then have the reactive polyurethane system introduced into it by pumping, said system being composed of polyols, polyisocyanates, and, if desired, further additives such as catalysts, foam stabilizers, and blowing agents. The mold is then closed. After the cure time the mold is opened and the shaped part is demolded.

It can be advantageous to heat the release agents of the invention to above the respective melting range before they are applied to the mold. Also in existence are devices which allow the spraying of two separate fractions, so that all of the components of the release agents of the invention may first be combined directly on the mold, with the release film of release agents of the invention being formed only within the mold immediately prior to the pumped introduction of the reactive polyurethane mix.

The examples set out below describe the present invention exemplarily, without any intention that the invention, whose application is indicated by the entirety of the description and the claims, should be confined to the embodiments given in the examples.

EXAMPLES

List of substances used:
synthetic paraffin wax=commercial waxes with a solidification temperature of 50 to 100° C.,
magnesium stearate,
Pionier® 2071T=technical white oil, low aromatic content, manufacturer: Hansen & Rosenthal KG,
Kosmos® 19=dibutyltin dilaurate (DBTL), manufacturer: Degussa GmbH,
DC® 190=polyethersiloxane, manufacturer: Air Products Inc.,
Desmophen® PU 21IK01=polyetherpolyol, manufacturer: Bayer AG,
Tegoamin® TA 33, manufacturer: Degussa GimbH,
Tegoamin® AS-1, manufacturer: Degussa GmbH,
Tegostab® EP-K-38=organically modified siloxane, manufacturer: Degussa GmbH,
Suprasec® 2412=diphenylmethane 4,4'-diisocyanate, manufacturer: Huntsman Inc.

Example 1

Inventive Release Agent, VOC-Free 80.0% by weight of synthetic paraffin wax (solidification point 95° C.) and 5.0% by weight of magnesium stearate were melted and admixed with 5.0% by weight of Pionier® 2071 T. The wax melt was admixed with 5.0% by weight of Kosmos® 19 and 5.0% by weight of DC® 190, with stirring.

Example 2

Inventive Release Agent, VOC-Free 90.0% by weight of synthetic paraffin wax (solidification point 100° C.) and 5.0% by weight of magnesium stearate were melted and admixed with 5.0% by weight of Pionier® 2071 T.

Comparative Example A

Conventional VOC-Containing Release Agent 4.5% by weight of synthetic paraffin wax (solidification point 95° C.) and 0.5% by weight of magnesium stearate were melted and admixed with 45% by weight of isoparaffin (flash point 56° C.). 48.5% by weight of isoparaffim (flash point 56° C.) were admixed with 0.5% by weight of Kosmos® 19 and 1% by weight of DC® 190 and this mixture was added to the wax dispersion, with stirring.

Release Effect Tests:

The release agents of examples 1 and 2 and also of comparative example A were applied by spraying in realistic amounts of 10 g/m$^2$ to metal test plates, using a 0.5 mm nozzle, and a foamable polyurethane system consisting of 100 parts of Desmophen® PU 211K01, 3.5 parts of water, 0.4 part of Tegoamin® TA 33, 0.25 part of Tegoamin® AS-1, 0.7 part of diethanolamine, 0.5 part of Tegostab® EP-K-38, 0.2 part of acetic acid (60% in water), and 63.5 parts of Suprasec® 2412 was foamed onto these plates in a box mold at 55° C.

After curing had taken place (10 minutes), the metal plates were peeled from the foam using a spring force meter, in order to measure the extent of the release effect. The results are summarized in table 1.

TABLE 1

Results of the determination of the release effect

| Release agent of example | Assessment of foam surface | Force for peeling the metal plate from the foam [kg] |
|---|---|---|
| 1 | fine-poredly open, dry | 2 |
| 2 | fine-poredly open, dry | 2 |
| A | fine-poredly open, dry | 2 |

As is evident from the table above, the VOC-free release agents of the invention meet the requirements for release effect and pore properties of the foam parts. On account of their VOC freedom they exhibit distinct advantages over the release agent A based on conventional solvents.

While the present invention has been particularly shown and described with respect to preferred embodiments thereof it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A release agent for producing polyurethane moldings, comprising:
    A) 50% to 99.5% by weight of at least one wax having release activity; and
    B) 0.5% to 50% by weight of at least one oil having release activity, with the proviso that the release agent contains no water and no volatile organic solvent having a boiling temperature of less than 250° C. or a vapor pressure at 293.15 kelvins of greater than 0.01 kilopascal, and the oil with release activity is substantially free of unsaturated hydrocarbons.

2. The release agent as claimed in claim 1, further comprising C) one of an auxiliary and an adjuvant.

3. The release agent as claimed in claim 1, wherein said at least one wax having release activity is selected from liquid, solid, natural or synthetic waxes, esters of carboxylic acids with alcohols or fatty alcohols and/or metal soaps of fatty acids, and said at least one oil having release activity is selected from hydrocarbons that are viscous or liquid at room temperature, saturated oligomeric and/or polymeric hydrocarbons, and silicone oils, which may be substituted by aliphatic or aromatic hydrocarbon radicals.

4. The release agent as claimed in claim 1, consisting of:
A) 50% to 99.5% by weight of said at least one wax having release activity,
B) 0.5% to 50% by weight of said at least one oil having release activity, and
C) at least one component selected from an auxiliary and an adjuvant.

5. The release agent as claimed in claim 1, wherein said at least one wax with release activity is a synthetic paraffin wax.

6. The release agent as claimed in claim 1, wherein said at least one oil with release activity is a hydrocarbon having a vapor pressure at 293.15 kelvins of $\leq 0.01$ kilopascal.

7. A method of producing a polyurethane molding comprising:
heating a mold to a desired molding temperature;
providing a release agent to wall portions of said mold, wherein said release agent includes A) 50% to 99.5% at least one wax having release activity; and B) 0.5% to 50% at least one oil having release activity, with the proviso that the release agent contains no water and no volatile organic solvent having a boiling temperature of less than 250° C. or a vapor pressure at 293.15 kelvins of greater than 0.01 kilopascal, and the oil with release activity is substantially free of unsaturated hydrocarbons;
introducing a reactive polyurethane system into said mold;
closing said mold;
curing said reactive polyurethane system, within said closed mold, whereby said reactive polyurethane system is shaped into a molded product having a shape corresponding to that of said mold; and
releasing said molded product from said mold.

8. The method as claimed in claim 7, wherein said release agent further comprises C) one of an auxiliary and an adjuvant.

9. The method as claimed in claim 7, wherein said at least one wax having release activity is selected from liquid, solid, natural or synthetic waxes, which may also have been oxidized and/or partly hydrolyzed, esters of carboxylic acids with alcohols or fatty alcohols and/or metal soaps of fatty acids, and said at least one oil having release activity is selected from hydrocarbons which are viscous or liquid at room temperature, saturated oligomeric and/or polymeric hydrocarbons, and silicone oils, which may be substituted by aliphatic or aromatic hydrocarbon radicals.

10. The method as claimed in claim 7, wherein said at least one wax with release activity is a synthetic paraffin wax.

11. The method as claimed in claim 7, wherein said at least one oil with release activity is a hydrocarbon having a vapor pressure at 293.15 kelvins of $\leq 0.01$ kilopascal.

12. The method as claimed in claim 7, wherein said desired molding temperature is from 45° to 80° C.

13. The method as claimed in claim 7, wherein said release agent is provided on wall portions of said mold by spraying said release agent on said mold to provide a uniform release film on said wall of said mold.

14. The method as claimed in claim 7, wherein said polyurethane reactive system is introduced into said mold by pumping.

15. The method as claimed in claim 7, wherein said polyurethane reactive system is comprised of polyols and polyisocyanates.

* * * * *